Dec. 12, 1944.  A. J. TROTT  2,364,929
VALVE
Filed Feb. 6, 1943
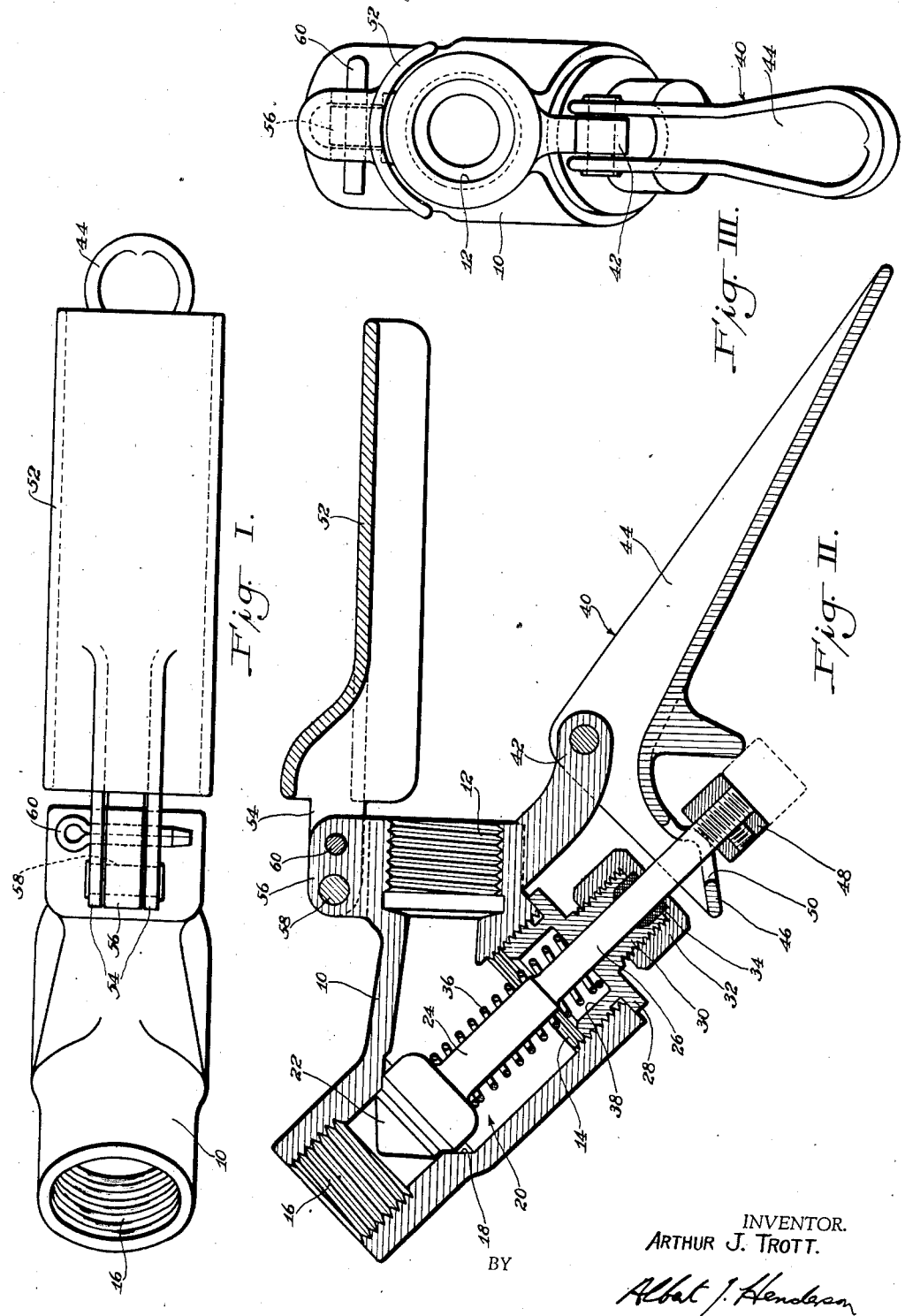
INVENTOR.
ARTHUR J. TROTT.
BY
Albert J. Henderson
ATTORNEY.

Patented Dec. 12, 1944

2,364,929

UNITED STATES PATENT OFFICE 2,364,929

VALVE

Arthur J. Trott, Greensburg, Pa., assignor to Walworth Patents Inc., Boston, Mass., a corporation of Massachusetts Application February 6, 1943, Serial No. 474,927

3 Claims. (Cl. 251—134)

This invention relates to valves of the quick opening, self-closing type.

Valves of the type indicated may be attached to pipes, hoses and like fluid conveying members and operated manually to emit a stream or spray of fluid for an indeterminate period depending upon the length of time the valve is held open. To insure quick cessation of fluid flow, it is undesirable to use mechanical locking means for holding the valve in open position, which necessitates in some instances prolonged manual effort for holding the valve in this position against spring tension tending to close it. An object of this invention is to effect opening of the valve with a single direct movement.

Another object of the invention is to permit the valve to be retained in open position without excessive effort or fatigue on the part of the operator.

Another object of the invention is to insure ease and comfort in operation particularly where hot fluids are being controlled by the valve.

Another object of the invention is to avoid undue interference with streamline flow of the fluid when the valve is held in open position.

Other advantages will become apparent from the following description taken in connection with the accompanying drawing wherein:

Fig. I is a plan view of the valve,

Fig. II is a longitudinal sectional view, and

Fig. III is an end view.

Referring more particularly to the drawing, the valve comprises a casing 10 having a contour in form generally termed a Y, that is, with two angular branches 12 and 14 projecting from a trunk 16 as seen in longitudinal section Fig. II. The casing 10 is hollow and is provided with internal threads, adjacent the end of the trunk 16 and one branch 12, for the reception of hose, pipe or tube connections for the inlet of fluid at branch 12 and the outlet therefor at the trunk 16. An annular shoulder 18 formed on the inner wall of the casing intermediate the branch 12 and trunk 16 provides a valve seat located on substantially the same axis as the opening in the branch 14.

A valve member 20 is reciprocable in the casing and comprises a substantially conical head 22, cooperable with the valve seat 18, and a stem portion 24 projecting from the head 22. The valve stem 24 extends through the opening in the branch 14 and is reduced, as at 26, for insertion in a bonnet 28 threadedly secured in the opening of the branch 14 and forming a guide for the stem. The bonnet 28 is provided with a threaded projection 30 for engagement by a packing gland 32 and suitable packing 34 is contained within a recess in the projection 30 and compressed about the reduced stem portion 26 by operation of the packing gland 32.

The valve is of the self-closing type and for this purpose a coil spring 36 surrounds the valve stem 24 between the valve head 22 and the bonnet 28, the latter being provided with a recess 38 to accommodate one end of the spring 36. A valve operating member 40 is pivotally mounted on a bracket 42 projecting from the casing 10 on one side of the branch 12. The operating member 40 is in the form of a bell-crank lever having a relatively long arm 44 and a shorter arm 46, the longer arm 44 being adapted for manual engagement and the shorter arm 46 being adapted to move the valve member 20 away from its seat 18 against the tension of the spring 36. This movement of the valve member is effected by the provision of an abutment in the form of a nut 48 secured to the terminal end of the stem portion 26 and being engaged by the shorter arm 46 which is provided with an aperture 50 through which the reduced stem portion 26 projects. Thus, upon manual operation of the valve operating member 40, the shorter arm 46 of the bell-crank lever will move in a plane substantially perpendicular to the axis of the valve stem to compress the spring 36 and lift the valve member 20 off its seat. Upon release of the operating member 40 the spring 36 will immediately return the valve member 20 to its seat and thus cut off flow of fluid from the inlet 12 to the outlet 16.

It will be apparent that manual operation of the operating member 40 against the tension of the spring 36 will require a source of leverage. Such leverage might be afforded by placing the fingers of the hand around the arm 44 of the operating member while the remainder of the hand embraces the pipe or hose attached to the inlet 12. However, the pressure on the hose which would result when the operating member was manipulated might cause damage to the hose; or if hot liquids were being conveyed, injury to the hand of the operator might result. Accordingly, a guard member 52 is provided in this invention which will preclude injury to the hose or to the hand of the operator and will afford adequate purchase for raising the valve member 20 against spring tension. The guard member 52 may take the form of an elongated bar of arcuate cross section and provided with a bifurcated end 54 which straddles a lug 56 formed on the casing 10 on the side of the branch 12 preferably diametrically opposite the bracket 42 which carries the operating member 40. In this embodiment the guard member 52 is pivotally attached to the lug 56 by means of a pin 58 projecting through the lug 56 and the bifurcated end 54. Owing to this attaching means the guard member 52 may be swung away from the branch 12 to provide ample clearance for attaching or detaching a hose or pipe to the opening in the branch 12. In its normal position the guard member 52 extends in the same general direction as the longer arm 44 of the operating member 40 and its arcuate shape permits it to fit closely around the pipe or tube in opening 12. A cotter pin 60 is inserted through apertures in the bifurcated portion 54 and the lug 56 in the same manner as the pin 58, but spaced therefrom. The cotter pin 60 cooperates with the pivot pin 58 to secure the guard rigidly in position but may readily be withdrawn from engagement with the parts to permit the swinging movement of the guard member 52 as previously described.

From the foregoing description, it will be apparent that all the objects of the invention have been accomplished and that while one embodiment of the invention has been shown and described, various changes may be made in the details of construction without departing from the spirit of the invention or the scope of the appended claims.

I claim:

1. A valve comprising a casing having a fluid passageway therethrough, a valve seat in said casing intermediate the ends of said passageway, a hollow projection on said casing offset from said passageway but communicating therewith, a valve member cooperable with said valve seat, a valve stem extending from said valve member through said projection exteriorly of said casing, means for biasing said valve member towards said seat, a valve lever pivotally mounted on said casing on one side of said passageway and engaging said valve stem, said lever being manually operable for overcoming said biasing means and moving said valve member away from said seat, a guard member extending from said casing in the same general direction as said lever but on the opposite side of said passageway, a pivotal mounting for said guard member on the casing for swinging movement thereof to permit unobstructed access to said passageway, and means for securing the guard member rigidly in position for manual engagement coincident to operation of said lever, said securing means being located adjacent said pivotal mounting.

2. A valve comprising a hollow casing of Y-form contour providing inlet and outlet passages for fluid and an opening offset therefrom, a valve seat in said casing intermediate the ends of said passages, a bonnet member secured in said opening, a valve member engageable with said seat and having a stem extending through said bonnet, yieldable means between said bonnet and valve member urging the latter to its seat, a bell-crank lever mounted on the casing and having operative engagement with said valve stem, said lever having an arm extending from said casing adjacent said inlet passage for manual operation of said valve member against the pressure of said yieldable means, a guard member pivotally mounted at one end thereof on the casing adjacent said inlet opening on the side opposite said lever arm and adapted to be positioned for manual engagement coincident to operation of said lever, and detachable means for securing the guard member rigidly in said position and from which it may be swung on its mounting upon detachment of said means to afford unobstructed access to said inlet passage, said securing means being located at said end of the guard member adjacent said pivotal mounting.

3. A valve comprising a hollow casing of Y-form contour providing inlet and outlet passages for fluid and an opening offset from said passages, a valve seat in said casing intermediate the ends of said passages and in axial alignment with said opening, a bonnet member secured in said opening and having an axial aperture therein, a valve member having a head cooperable with said valve seat and a stem extending through said aperture exteriorly of said casing, yieldable means operable between said bonnet and head for urging said valve member to closed position, an abutment on the exterior end of said valve stem, a bracket carried on said casing between said inlet passage and said opening, a manually operable bell-crank lever pivotally mounted on said bracket and having one arm engageable with said abutment, said lever having a second arm extending from said casing and operable manually in a plane substantially perpendicular to the axis of said valve stem for moving said valve member to open position, a guard member of arcuate cross-section having a projecting end engaging with said casing, said guard member extending therefrom in the same general direction as said second lever arm but on the side of said inlet passage remote from said opening, a pivot pin projecting through said casing and projecting end for mounting the guard member for swinging movement to permit unobstructed access to said inlet passage, and a detachable locking pin adapted for insertion through said casing and projecting end but spaced from said pivot pin for cooperation therewith to secure said guard member rigidly in position for manual engagement coincident to operation of said lever and affording leverage facilitating said operation thereof.

ARTHUR J. TROTT.